Sept. 18, 1962 R. D. RUMSEY 3,054,478
FRICTION HYDRAULIC SNUBBER
Filed July 31, 1961 2 Sheets-Sheet 1
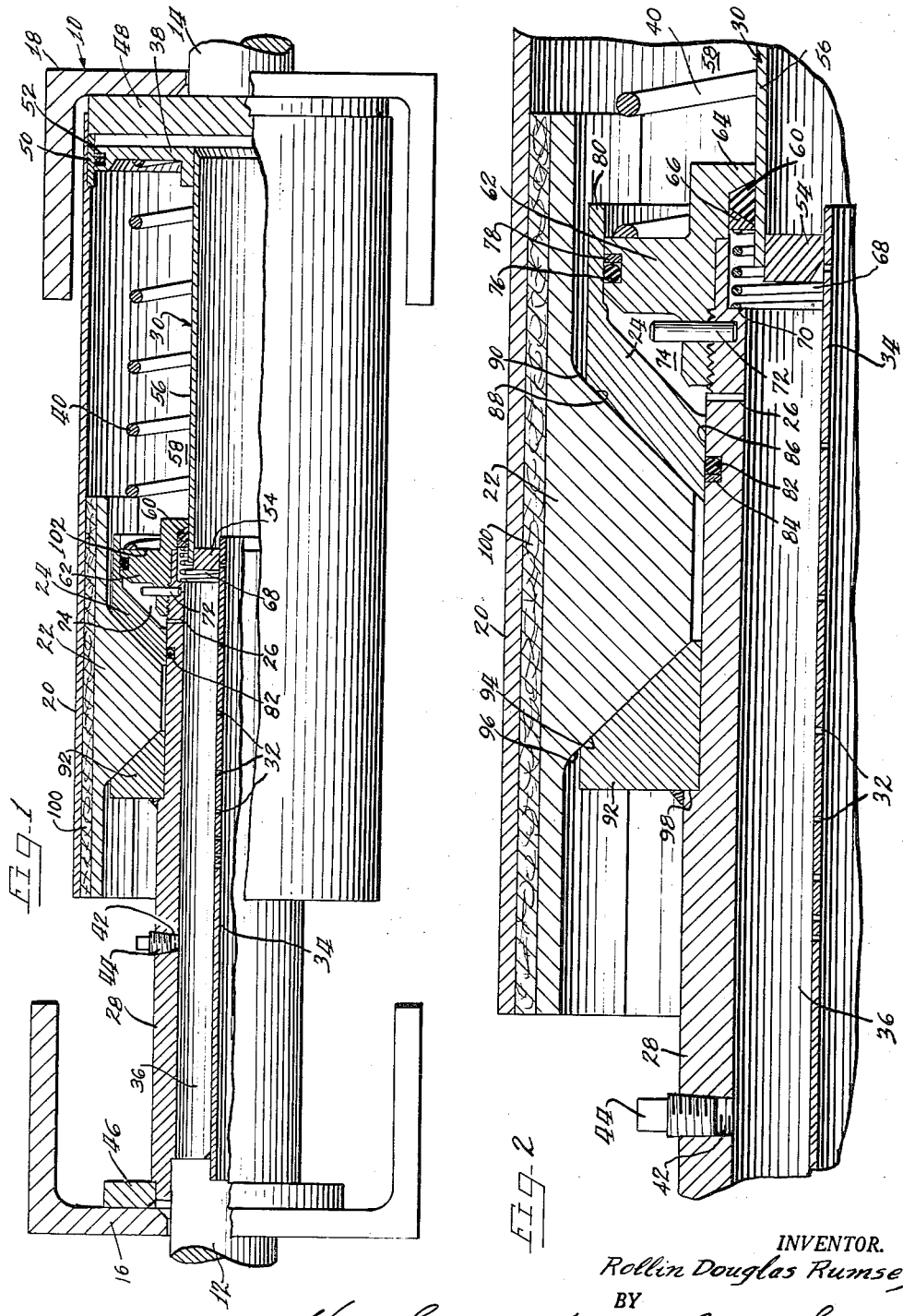
INVENTOR.
Rollin Douglas Rumsey
BY
ATTORNEYS Sept. 18, 1962
R. D. RUMSEY
3,054,478
FRICTION HYDRAULIC SNUBBER
Filed July 31, 1961
2 Sheets-Sheet 2
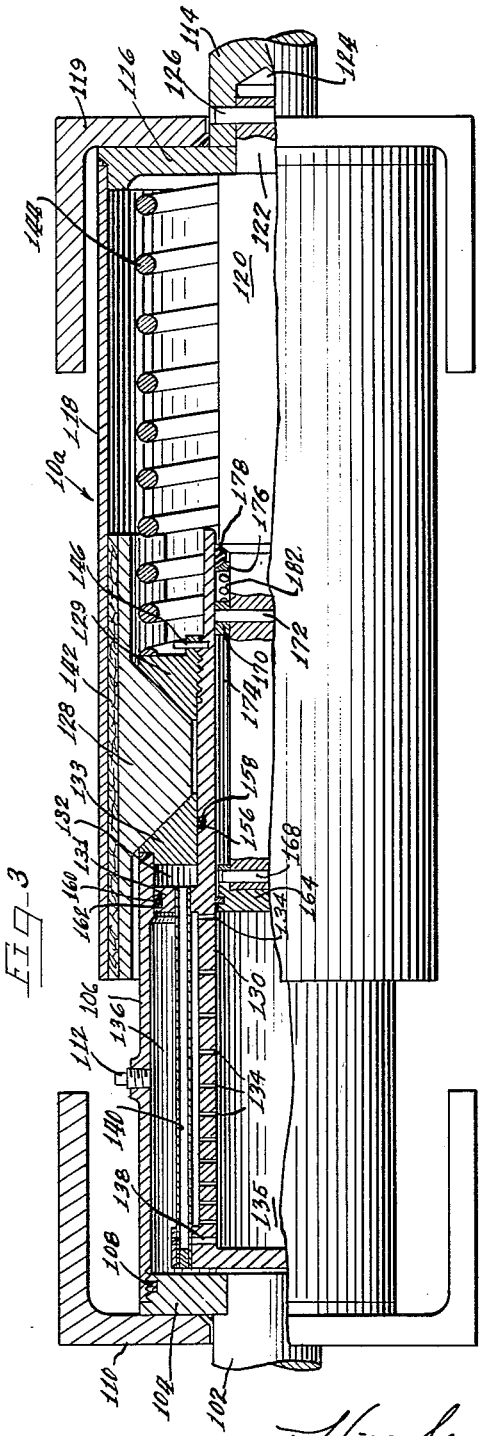
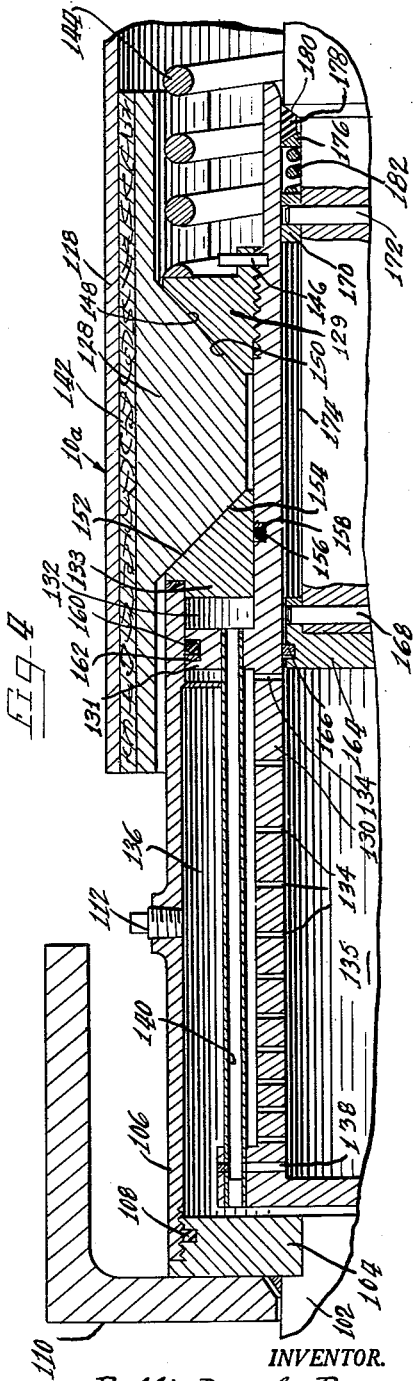
INVENTOR.
Rollin Douglas Rumsey
BY
ATTORNEYS United States Patent Office 3,054,478
Patented Sept. 18, 1962

3,054,478
FRICTION HYDRAULIC SNUBBER
Rollin Douglas Rumsey, Buffalo, N.Y., assignor to Houdaille Industries, Inc., a corporation of Michigan
Filed July 31, 1961, Ser. No. 128,238
15 Claims. (Cl. 188—86)

This invention relates to a snubber for absorbing stresses between relatively movable parts, and more particularly to a friction snubber having the characteristics of a hydraulic buffer so that efficiency in operation and manufacture may be realized.

In a hydraulic buffer of high capacity, it is necessary to have a large diameter cylinder honed to a very smooth finish, capable of withstanding high pressures but smooth enough to prevent leakage past the various seals. This combination of multiple requirements generally results in a high cost assembly.

The present invention resolves the problem thus presented by the high capacity hydraulic buffer by utilizing hydraulic elements which are relatively small while making the relatively large elements (which are the load carrying elements) of materials such as do not require close tolerance control, or accurate machining.

Accordingly, it is an object of the present invention to provide a friction snubber having the characteristics of a hydraulic buffer so that a relatively low cost of manufacture is afforded without sacrifice in the effectiveness of snubbing action.

Another object of the invention is to provide a snubber as described wherein the load on the friction shoes is a function of the closing velocity of the snubber and is a variable load which is regulated by an orifice pattern in a hydraulic metering tube.

Other objects and advantages of the invention will become apparent as the description proceeds in accordance with the drawings in which:

FIGURE 1 is a side elevational view, partly in vertical section and partly broken away, of a snubber according to the present invention;

FIGURE 2 is an enlarged view, partly broken away, of the structure shown in FIGURE 1;

FIGURE 3 is a side elevational view, partly in vertical section and partly broken away, of a second embodiment of the invention; and FIGURE 4 is a view, partly broken away, of the structure shown in FIGURE 3.

Referring now to the drawings, and to FIGURES 1 and 2 in particular, a snubber 10 is shown in accordance with the present invention which is adapted to be connected between relatively movable members and includes rods 12 and 14 either of which can be connected to a load imposing member. The snubber 10 is shown in the fully extended position thereof and a load imposed on either of the rods 12 and 14, thus providing a double action, is therefore effective to shorten the snubber between mounting brackets 16 and 18.

The snubber 10 has a pressurized replenishing system and comprises a snubber barrel 20 within which are friction shoes 22 forced out against the barrel 20 by the action of a wedge shaped hydraulic piston 24 which receives high pressure fluid through an orifice hole 26 in the wall of a tube 28, the pressure on the fluid being generated by the closing velocity acting on a piston 30. Thus the load on the friction shoes 22 is variable in accordance with the velocity of the piston 30, which velocity is a function of the closing velocity of the snubber 10. The closing velocity of the snubber 10 is regulated by the orifice pattern of the holes 32 in a metering tube 34. As the snubber closes, oil or other fluid is forced from the chamber 36 formed by the tube 28 and the metering tube 34 through the metering holes 32 and into the interior of the piston 30, where it acts upon a piston 38 fixedly secured to the piston 30 movable within the snubber to absorb the fluid thus passed through the orifices 32, as controlled by the helical spring 40, as hereinafter further described.

The chamber 36 may be replenished through an orifice 42 having a threaded connection 44, which may be any suitable filler plug, and it will be seen that the tubes 28 and 34 form an integral unit with the rod 12 and with the abutment ring 46 in abutting engagement with the mounting bracket 16. Likewise, the snubber barrel 20, or casing, forms an integral unit with the rod 14, backing plate 48 and cylinder or barrel liner 50, the rod 14 being free to slide through the bracket 18. The piston 30, however, is slidable within the barrel or cylinder 20 with the piston head 38 thereon sealingly engaging the liner 50 by means of an O ring 52. The piston 30 has a piston head 54 slidably engaging the tube 34 in substantially sealing relationship to successively seal off the patterned orifices 32 and effect a damping action by the incremental reduction in the fluid escaping from the chamber 36. Likewise, the piston 30 and the hollow piston rod 56 thereof is maintained in sealing relationship with the external chamber 58 by means of a resilient annular seal 60 of cross-sectionally frusto-conical configuration retained sealingly against a cylinder cap 62 threadedly secured to the inner end of the tube 28. The cylinder cap 62 is formed with a radially inwardly and complementarily bevelled shoulder 64 for engaging the seal 60 and a bearing ring of correspondingly bevelled configuration 66 is urged against the opposite side of the seal 60 by a helical spring 68 bottoming against a shoulder 70 on the tube or cylinder 28, thereby to assure the sealing action of the seal 60 and to direct a sealing component of the force radially inwardly against the rod portion 56 of the piston 30 passing beneath the said seal 60.

A lock pin 72 may be used to connect the cylinder cap 68 in firmly fixed position on the end of the tube or cylinder 28, and in order to seal the high pressure chamber 74 while affording relative limited slidable movement of the piston 24, an O ring 76 and back up ring 78 are mounted in the outer surface of the cap 68 for sealing engagement with an axially extending flange 80 on the piston 24. Likewise, an O ring 82 and back up ring 84 may be disposed in the tube 28 for sealing engagement with the inner axially extending surface 86 of the piston 24.

In order to translate a variable load to the friction shoe 22 from the piston or wedge ring 24 as a result of varying pressure in the high pressure chamber 74, also as further described, the piston or wedge ring 24 has a wedge surface 88 complementary to a facing surface 90 of the shoe 22 and the shoe is thus urged radially outwardly by means of a wedge shaped back up abutment 92 having a complementary camming surface 94 coacting with the surfaces 96 on the shoes 22 which extend convergingly radially inwardly cooperatively with the camming surfaces 90 on the said shoes. The back up wedge ring 92 is fixedly secured in position on the tube 28 in a reduced portion of the tube coextensive with the portion receiving the sealing elements 82 and 84, and a back up shoulder 98 engages the back surface of the wedge ring 92. The shoes 22 may have an outer friction liner 100 formed of any suitable friction material as understood by those skilled in the art for snubbing action against the cylinder 20. Thus it will be seen that the shoes 22 with their friction liners have a combined maximum cross-sectional dimension which is less than the distance from the reduced surface of the tube 28 to the cylinder 20, so that the action of the piston 24 may cam the shoes 22 in cooperation with the wedge ring 92.

In operation therefore, the imposition of a load on either of the rods 12 or 14 parts a closing velocity to the snubber 10 which is regulated by the spacing of the orifices 32. Thus as the piston 30 and its head 54 move into the chamber 36, oil is expressed through the openings 32, but the openings are preferably spaced a relatively great distance apart adjacent the initial location of the piston 30 for the extended position of the snubber, and are successively reduced so that a given linear movement of the piston will close off more of the orifices as the piston approaches its terminal location in the chamber 36. Therefore, the closing velocity of the snubber may be relatively great initially, but as successive orifices 32 are closed off the build-up of pressure in the chamber 36 resulting from the increasingly slow escape of fluid through the orifices 32 damps the velocity of the piston 30 and hence the closing velocity of the snubber. Correspondingly, the velocity of the snubber controls the pressure in the chamber 36 and the pressure in the high pressure chamber 74 and thereby controls the force acting on the piston 24 and the radially outwardly directing force on the shoes 22. The velocity of the snubber is a variable controlling the pressure on the snubber shoes 22, and hence the damping action on the snubber as a whole, and acts in concert with the variable provided by the spacing of the orifices 32, since the movement of the piston 30 closes off successive orifices and leads to a build-up of pressure despite deceleration of the piston 30. Therefore, the velocity of the piston itself and the spacing of the orifices 32 as controlling the velocity and also as controlling the pressure, provide a force which can be accurately calibrated to yield the desired damping action for the snubber.

The passage of fluid from the chamber 36 into the tube 34 and thence through the piston 30 to the rear of the piston will impart a pressure to the piston 38 which is opposed by the spring 40. The spring 40 thus acts as an accummulator in cooperation with the piston 38 to return fluid through the orifices 32 after closing of the snubber, the spring 40 being bottomed upon the radial surface 102 of the cylinder cap 62 and bearing against the piston 38. In general, therefore, the movement of the rod 14 toward the rod 12 will serve to move the piston 30 inwardly with the fluid expressed through the orifices 32 providing a cushion between the piston 38 and the backing plate 48 and with the piston 38 thereafter returning the fluid through the system to the chamber 36. In this way also, a two-way action is provided in which sense a shock absorber is afforded.

The outwardly directed force through the shoe 22 thus produced imparts a hydraulic force varying the snubbing action as a function of the closing velocity of the snubber. Also, the resistance of the spring 40 to compression provides a mechanical shock absorber damping action and serves to maintain a pressure condition in part controlling flow through the orifices 32 and hence effecting the pressure acting on the piston 24 and the hydraulic force acting through the friction shoes for snubbing action.

A primary advantage of the snubber described over conventional friction devices resides in the fact that regardless of the initial velocity on the load, the load will be stopped when the snubber has reached the end of its travel, whereas in a conventional snubber if the load or velocity are low, the snubber will stop its closing action before the end of the travel. Conversely, with conventional devices, if the load or velocity are high, the snubber will hit the end of its stroke. A further advantage is that except for piston 24, piston rod tube 56 and cylindrical liner 50, for example, which in general are desirably finished with a smooth finish, the elements of the snubber of the invention may be roughly finished and close tolerances are in general not required.

Referring now to FIGURES 3 and 4, a second embodiment of the invention is shown wherein the snubber in generally designated by reference numeral 10a. The snubber 10a is generally similar in its operation to the snubber 10, but as illustrated is a gravity replenished unit and whereas the seal for the piston 30 was made relative to the external surface of the rod portion 56, the present embodiment reverses the external sliding rod seal, whereby the seal always operates on a clean wall surface and is always lubricated, whereas the exterior of the rod portion 56 desirably is chrome plated so as to minimize any friction which might result from possible tendencies for dust to collect on the surface 56.

Further, whereas the external rod seal for the first embodiment was subjected to full damping pressure, in the present embodiment the corresponding seal is subjected substantially only to reservoir pressure, after the piston ring has passed the first metering hole of a series of metering holes or orifices similar to the orifices of the previous embodiment. Also, in the present embodiment the metering tube of the previous embodiment has been eliminated and replaced by a construction wherein the holes or orifices are formed in the wall of the reservoir structure.

Thus the snubbing unit 10a comprises a rod 102 carrying an annular abutment ring 104 to which is threadedly connected a reservoir tube 106 with a seal 108 being utilized in the threaded connection. A mounting bracket 110 surrounds the rod 102 in abutting engagement with the abutment ring 104 as in the preceding embodiment. The reservoir tube 106 may have a filler plug 112 as also previously described.

Likewise, the unit 10a may have a load receiving rod 114 fixedly secured to an abutment plate 116 to which is rigidly connected a barrel or casing 118, and a mounting bracket 119 surrounds the rod 114 in abutting engagement with the plate 116. However, the rod 114 has axially secured thereto a hydraulic cylinder rod 120, by means of a reduced end portion 122 received in an axial recess 124 in the rod 114 and connected to the rod by a lock pin 126. Within the snubber barrel 118 are friction shoes 128 adapted to be forced out against the barrel by the action of a wedge shaped piston or wedge ring 129 threadedly secured to a hydraulic cylinder 130. The hydraulic cylinder 130 includes a pressure flange or wall 131 forming a pressure chamber 132 with the fluid reservoir cylinder 106 and with a wedge ring 133 fixedly secured to the reservoir cylinder 106. The hydraulic cylinder 130 defines a plurality of axially spaced orifices 134 therein adapted to transmit oil or other fluid from a pressure chamber 135 in the pressure cylinder to a reservoir 136 formed by the reservoir cylinder, in response to axially inward movement of the hydraulic cylinder rod 120 as hereinafter further described. However, fluid will also be passed from the pressure chamber 135 to the pressure chamber 132 through a passage 138 in the hydraulic cylinder 130 and thence through a transfer tube 140 formed of steel or like material and opening into the chamber 132. Accordingly, pressure in the chamber 132 will urge the hydraulic cylinder 130 away from the wedge ring 133 and will urge the piston 129 against the shoes 128 to direct a radial force against the shoes, thereby increasing the friction action of the shoes and their lining 142 against the barrel or casing 118 in accordance with the closing velocity of the snubber.

The piston 129 is also urged against the shoes 128 to produce a friction force by mechanical means including a spring 144 which bears against the plate 116 and also against the back wall of the piston 129. The spring 144 further serves to control the action of the snubber in closing and to provide a return to the extended position of the snubber. However, it will be seen that the spring does not directly effect replenishing of the fluid and, in contrast to the first embodiment, fluid will return to the reservoir 135 by a normal gravity interchange through the orifices 134.

The piston 129 may further be secured to the hydraulic cylinder 130 by a lock pin 146, and it will be seen that a face 148 of the piston is complementary to a face 150 of the shoes 128 pursuant to the preceding embodiment. Correspondingly, the wedge ring 133 has a face 152 complementary to faces 154 on the shoes 128.

In order to maintain the pressure in the chamber 132, the hydraulic cylinder 130 may be provided with an O-ring 156 and a back up ring 158, and the flange 131 is similarly provided with an O-ring 160 and back up ring 162. The hydraulic cylinder rod 120 is provided with a piston head 164 and a piston ring seal 166 to maintain a sealing relationship with the interior of the hydraulic cylinder 130. The piston head 164 may be maintained on the cylinder rod 120 by a lock pin 168 or the like. The cylinder rod 120 rides within the cylinder 130 as guided by a bearing 170 secured around the reduced forward end of the rod by a lock pin 172 or the like. In order to maintain a sealed condition for the space 174 between the rod and the cylinder 130, sealing means are provided at the end of the space including a pressure ring 176 engaging an annular seal 178 and urged against the seal 178 to bias the seal against a complementarily chamfered shoulder 180, by means of a spring 182 bearing against the pressure ring 176 and the bearing 170. It will thus be seen that the seal 178, like the seal 60, imparts a radially directed component of sealing force against the surface slidably associated therewith.

As the hydraulic cylinder rod 120 on the piston head 164 moves into the high pressure chamber 135, the piston ring 166 will move past the orifice 134 immediately adjacent the piston head and thereupon the area 174 between the hydraulic rod and the hydraulic cylinder 130 will be subjected substantially only to the pressure in the reservoir 136, as this orifice and successive orifices communicate with the space 174. Thus the seal 178 restrains the reservoir pressure only, after the initial passage of the piston ring past the first orifice 134 as described. Further, the inner surface of the cylinder 130 provides a continually lubricated and clean bearing surface for the seal 178.

The orifices 134 are similarly disposed in axially spaced relation such that the density of the orifices per unit length increases toward the end of the inward piston stroke, to accommodate the fluid displaced by continued inward movement of the piston while damping the closing action at a predetermined rate in accordance with the said spacing. Accordingly, the pressure in the chamber 132 and on the piston 129 and the shoes 128 is a function of the closing velocity of the snubber.

The snubber of this invention is therefore hydraulically and mechanically controlled, and is stronger and more compact than previously available devices. For example, in the respective embodiments described, the length of the snubber may be approximately three times the stroke length.

It will be appreciated that a large number of variations of damping force and rebound damping are encompassed within the scope of the invention and may be achieved by varying the wedge or carrying angles in addition to variations in the orifice pattern. And in respect to the first embodiment, it will also be evident that a metering pin could be substituted for the metering tube described.

The damping or frictional force in the device is proportional to the hydraulic pressure applied to the friction element, and it will also be seen that such hydraulic pressure may be obtained with hydraulic pressure generating means located remotely from the friction element. In this respect, friction snubber constructions embodying the principles of the invention are particularly suitable in railroad or military tank applications, though not limited thereto. Thereby, adequate shock absorber capacity can be provided for heavy tanks and the like, and by connecting the snubber according to the invention with the tank's hydraulic system, the pressure could be set very low for smooth road conditions, could be adjusted upwardly to, for example, 1000 p.s.i., and in order to overcome the excessive rolling the tank undergoes during gun firing, the pressure could be increased to 3000 p.s.i., which would virtually lock the snubber, as is desirable in such an application. Accordingly, the device can serve the multiple functions in tanks of providing an unusually reliable, simple and inexpensive unit, affording a soft ride on smooth roads, a vehicle suspension system on rough terrain and a lockout function as needed.

Although I have herein set forth and described my invention with respect to certain specific principles and details thereof, it will be obvious to those skilled in the art that these may be varied without departing from the spirit and scope of the invention as set forth in the hereunto appended claims.

I claim as my invention:

1. A snubber adapted to be connected between a pair of relatively movable members comprising a hollow casing, a plurality of friction shoes mounted within said casing in frictional engagement with said casing, each of said shoes having a pair of relatively convergingly inclined camming surfaces extending inwardly relative to said casing, a tube extending into said casing and having a portion forming a camming surface complementarily engaging one camming surface on each of said shoes, a piston slidably and sealingly mounted on said tube and having a camming surface complementarily engaging the other camming surface on each of said shoes, means on said tube forming with said piston a pressure chamber, a coaxial tube in said first named tube having a plurality of axially spaced orifices therethrough, said tubes being closed at the ends thereof opposite said casing and having a supply of fluid therein, and a piston having an annular piston head slidable along the second named tube and including a tubular rod portion intermediate said first and second named tubes and in sealing relation to the inner end of the first named tube, the first named tube defining a passage opening into said pressure chamber and said casing having a closed end opposite said first named tube to move said piston rod and piston head along said second named tube to pressurize said pressure chamber to an extent controlled by the said orifices and the velocity of closing of said snubber to vary the force on the friction shoes as a function of the closing velocity of the snubber.

2. A snubber adapted to be connected between a pair of relatively movable members comprising a hollow casing, a plurality of friction shoes mounted within said casing in frictional engagement with said casing, each of said shoes having a pair of relatively convergingly inclined camming surfaces extending inwardly relative to said casing, a tube extending into said casing and having a portion forming a camming surface complementarily engaging one camming surface on each of said shoes, a piston slidably and sealingly mounted on said tube and having a camming surface complementarily engaging the other camming surface on each of said shoes, means on said tube forming with said piston a pressure chamber, a coaxial tube in said first named tube having a plurality of axially spaced orifices therethrough, said tubes being closed at the ends thereof opposite said casing and having a supply of fluid therein, and a piston having an annular piston head slidable along the second named tube and including a tubular rod portion intermediate said first and second named tubes and in sealing relation to the inner end of the first named tube, the first named tube defining a passage opening into said pressure chamber and said casing having a closed end opposite said first named tube to move said piston rod and piston head along said second named tube to pressurize said pressure chamber to an extent controlled by the said orifices and the velocity of closing of said snubber, said piston rod having a piston head at the other end thereof sealingly and slidably engaging said casing, and a spring surrounding said piston rod and bearing against said piston head on the other end of said piston rod and against said means on said first named tube forming a pressure chamber with said piston having a camming surface, whereby the fluid expressed into the second named tube during closing of the snubber is moved internally through said piston rod to the rear of said piston head on the other end of said piston rod to compress the spring, said spring thereby providing an accumulator serving to return the fluid through said orifices and to return the snubber to an extended position.

3. An hydraulic friction snubber comprising a casing, a plurality of friction shoes in said casing each having inwardly converging camming surfaces, a tube extending into said casing and closed at an outer end thereof and having an inner portion with an inclined camming surface engaging one of the camming surfaces of each of said shoes, an hydraulic cylinder in said tube extending into said casing and with an inner portion having an inclined camming surface engaging the other camming surface of each of said friction shoes, an hydraulic piston rod connected to said casing at the end opposite said tube and extending sealingly into said hydraulic cylinder, said hydraulic cylinder defining a plurality of orifices spaced axially therealong, said hydraulic piston rod having a piston head successively sealing said orifices from the portion of said hydraulic cylinder opposite said hydraulic piston rod, said hydraulic cylinder having a closed end and said orifices releasing fluid from the chamber formed by said hydraulic cylinder, said closed end of said hydraulic cylinder and said piston rod into said tube until successively closed off by said piston head, to control the closing velocity of said snubber, said tube and said cylinder having portions forming a pressure chamber acting on said hydraulic cylinder to cause the camming surface of said hydraulic cylinder to exert radially outward force on said shoes, and means communicating the fluid pressure from said chamber formed by said hydraulic piston and said hydraulic cylinder to said pressure chamber to vary the force on said friction shoes as a function of the closing velocity of said snubber.

4. An hydraulic friction snubber comprising a casing, a plurality of friction shoes in said casing each having inwardly converging camming surfaces, a tube extending into said casing and closed at an outer end thereof and having an inner portion with an inclined camming surface engaging one of the camming surfaces of each of said shoes, an hydraulic cylinder in said tube extending into said casing and with an inner portion having an inclined camming surface engaging the other camming surface of each of said friction shoes, an hydraulic piston rod connected to said casing at the end opposite said tube and extending sealingly into said hydraulic cylinder, said hydraulic cylinder defining a plurality of orifices spaced axially therealong, said hydraulic piston rod having a piston head successively sealing said orifices from the portion of said hydraulic cylinder opposite said hydraulic piston rod, said hydraulic cylinder having a closed end and said orifices releasing fluid from the chamber formed by said hydraulic cylinder, said closed end of said hydraulic cylinder and said piston rod into said tube until successively closed off by said piston head, to control the closing velocity of said snubber, said tube and said hydraulic cylinder having portions forming a pressure chamber acting on said hydraulic cylinder to cause the camming surface of said hydraulic cylinder to exert radially outward force on said shoes, means communicating the fluid pressure from said chamber formed by said hydraulic piston and said hydraulic cylinder to said pressure chamber to vary the force on said friction shoes as a function of the closing velocity of said snubber and a spring acting against said hydraulic cylinder and said casing to urge said casing and said tube apart with a restoring force.

5. An hydraulic friction snubber comprising a casing, a plurality of friction shoes in said casing each having inwardly converging camming surfaces, a tube extending into said casing and closed at an outer end thereof and having an inner portion with an inclined camming surface engaging one of the camming surfaces of each of said shoes, an hydraulic cylinder in said tube extending into said casing and with an inner portion having an inclined camming surface engaging the other camming surface of each of said friction shoes, an hydraulic piston rod connected to said casing at the end opposite said tube and extending sealingly into said hydraulic cylinder, said hydraulic cylinder defining a plurality of orifices spaced axially therealong, said hydraulic piston rod having a piston head successively sealing said orifices from the portion of said hydraulic cylinder opposite said hydraulic piston rod, said hydraulic cylinder having a closed end and said orifices releasing fluid from the chamber formed by said hydraulic cylinder, said closed end of said hydraulic cylinder and said piston rod into said tube until successively closed off by said piston head, to control the closing velocity of said snubber, said tube and said cylinder having portions forming a pressure chamber acting on said hydraulic cylinder to cause the camming surface of said hydraulic cylinder to exert radially outward force on said shoes, and means communicating the fluid pressure from said chamber formed by said hydraulic piston and said hydraulic cylinder to said pressure chamber to vary the force on said friction shoes as a function of the closing velocity of said snubber, said hydraulic piston rod having a reduced portion receiving fluid from said tube through the orifices passed by said hydraulic piston head.

6. An hydraulic friction snubber comprising a casing, a plurality of friction shoes in said casing each having inwardly converging camming surfaces, a tube extending into said casing and closed at an outer end thereof and having an inner portion with an inclined camming surface engaging one of the camming surfaces of each of said shoes, an hydraulic cylinder in said tube extending into said casing and with an inner portion having an inclined camming surface engaging the other camming surface of each of said friction shoes, an hydraulic piston rod connected to said casing at the end opposite said tube and extending sealingly into said hydraulic cylinder, said hydraulic cylinder defining a plurality of orifices spaced axially therealong, said hydraulic piston rod having a piston head successively sealing said orifices from the portion of said hydraulic cylinder opposite said hydraulic piston rod, said hydraulic cylinder having a closed end and said orifices releasing fluid from the chamber formed by said hydraulic cylinder, said closed end of said hydraulic cylinder and said piston rod into said tube until successively closed off by said piston head, to control the closing velocity of said snubber, said tube and said cylinder having portions forming a pressure chamber acting on said hydraulic cylinder to cause the camming surface of said hydraulic cylinder to exert radially outward force on said shoes, and means communicating the fluid pressure from said chamber formed by said hydraulic piston and said hydraulic cylinder to said pressure chamber to vary the force on said friction shoes as a function of the closing velocity of said snubber, said hydraulic piston rod having a reduced portion receiving fluid from said tube through the orifices passed by said hydraulic piston head and seal means in said reduced portion of said hydraulic piston rod in spaced relation to said hydraulic piston head and coacting with said hydraulic cylinder to prevent leakage therefrom into said casing.

7. An hydraulic friction snubber comprising a casing, a plurality of friction shoes in said casing each having inwardly converging camming surfaces, a tube extending into said casing and closed at an outer end thereof and having an inner portion with an inclined camming surface engaging one of the camming surfaces of each of said shoes, an hydraulic cylinder in said tube extending into said casing and with an inner portion having an inclined camming surface engaging the other camming surface of each of said friction shoes, an hydraulic piston rod connected to said casing at the end opposite said tube and extending sealingly into said hydraulic cylinder, said hydraulic cylinder defining a plurality of orifices spaced axially therealong, said hydraulic piston rod having a piston head successively sealing said orifices from the portion of said hydraulic cylinder opposite said hydraulic piston rod, said hydraulic cylinder having a closed end and said orifices releasing fluid from the chamber formed by said hydraulic cylinder, said closed end of said hydraulic cylinder and said piston rod into said tube until successively closed off by said piston head, to control the closing velocity of said snubber, said tube and said cylinder having portions forming a pressure chamber acting on said hydraulic cylinder to cause the camming surface of said hydraulic cylinder to exert radially outward force on said shoes, and means communicating the fluid pressure from said chamber formed by said hydraulic piston and said hydraulic cylinder to said pressure chamber to vary the force on said friction shoes as a function of the closing velocity of said snubber, said pressure chamber having one wall thereof formed by a flange on said hydraulic cylinder sealingly slidable within said tube.

8. An hydraulic friction snubber comprising a casing, a plurality of friction shoes in said casing each having inwardly converging camming surfaces, a tube extending into said casing and closed at an outer end thereof and having an inner portion with an inclined camming surface engaging one of the camming surfaces of each of said shoes, an hydraulic cylinder in said tube extending into said casing and with an inner portion having an inclined camming surface engaging the other camming surface of each of said friction shoes, an hydraulic piston rod connected to said casing at the end opposite said tube and extending sealingly into said hydraulic cylinder, said hydraulic cylinder defining a plurality of orifices spaced axially therealong, said hydraulic piston rod having a piston head successively sealing said orifices from the portion of said hydraulic cylinder opposite said hydraulic piston rod, said hydraulic cylinder having a closed end and said orifices releasing fluid from the chamber formed by said hydraulic cylinder, said closed end of said hydraulic cylinder and said piston rod into said tube until successively closed off by said piston head, to control the closing velocity of said snubber, said tube and said cylinder having portions forming a pressure chamber acting on said hydraulic cylinder to cause the camming surface of said hydraulic cylinder to exert radially outward force on said shoes, and means communicating the fluid pressure from said chamber formed by said hydraulic piston and said hydraulic cylinder to said pressure chamber to vary the force on said friction shoes as a function of the closing velocity of said snubber, said pressure chamber having one wall thereof formed by a flange on said hydraulic cylinder sealingly slidable within said tube and said means communicating pressurized fluid from said chamber formed by said hydraulic cylinder and said hydraulic piston rod including a conduit extending through a chamber formed between said tube and said hydraulic cylinder and through said flange, said hydraulic cylinder having an opening into said conduit adjacent said end wall thereof.

9. An hydraulic friction snubber comprising a casing, a plurality of friction shoes in said casing frictionally engaging said casing and each having inwardly converging camming surfaces, a tube extending into said casing and having a portion forming an inclined camming surface engaging one of the converging surfaces of each of said friction shoes, and an outwardly extending flange on the inner end of said tube, a piston having an inclined camming surface engageable with the other converging surface of each of said friction shoes and having an axial flange slidable and sealingly engaging the flange on said tube, and a surface opposite said flange on said tube forming with said flange on said tube and said tube a pressure chamber for urging the piston against said friction shoes, said tube being closed at the end opposite said casing and having an orifice leading into said pressure chamber, a hollow piston, the inner end of said tube slidably receiving said hollow piston, a supply of fluid in said tube and means coacting with said hollow piston to controllably release fluid from said tube in response to closing of said snubber and controlling the closing velocity of said snubber, said fluid in said tube being pressurized by closing of said snubber to transmit pressurized fluid to said pressure chamber and effect a variable force on said friction shoes which is a function of the closing velocity of said snubber.

10. An hydraulic friction snubber comprising a casing, a plurality of friction shoes in said casing frictionally engaging said casing and each having inwardly converging camming surfaces, a tube extending into said casing and having a portion forming an inclined camming surface engaging one of the converging surfaces of each of said friction shoes, and an outwardly extending flange on the inner end of said tube, a piston having an inclined camming surface engageable with the other converging surface of each of said friction shoes and having an axial flange slidably and sealingly engaging the flange on said tube, and a surface opposite said flange on said tube forming with said flange on said tube and said tube a pressure chamber for urging the piston against said friction shoes, said tube being closed at the end opposite said casing and having an orifice leading into said pressure chamber, a hollow piston, the inner end of said tube slidably receiving said hollow piston, a supply of fluid in said tube, a tube coaxial with said first-named tube and defining a plurality of axially spaced orifices, said hollow piston having a piston head successively closing off said orifices to controllably release fluid from said tube in response to closing of said snubber and controlling the closing velocity of said snubber, said fluid in said tube being pressurized by closing of said snubber to transmit pressurized fluid to said pressure chamber and effect a variable force on said friction shoes which is a function of the closing velocity of said snubber.

11. An hydraulic friction snubber comprising a casing, a plurality of friction shoes in said casing frictionally engaging said casing and each having inwardly converging camming surfaces, a tube extending into said casing and having a portion forming an inclined camming surface engaging one of the converging surfaces of each of said friction shoes, and an outwardly extending flange on the inner end of said tube, a piston having an inclined camming surface engageable with the other converging surface of each of said friction shoes and having an axial flange slidable and sealingly engaging the flange on said tube, and a surface opposite said flange on said tube forming with said flange on said tube and said tube a pressure chamber for urging the piston against said friction shoes, said tube being closed at the end opposite said casing and having an orifice leading into said pressure chamber, a hollow piston, the inner end of said tube slidably receiving said hollow piston, a supply of fluid in said tube and means coacting with said hollow piston to controllably release fluid from said tube in response to closing of said snubber and controlling the closing velocity of said snubber, said fluid in said tube being pressurized by closing of said snubber to transmit pressurized fluid to said pressure chamber and effect a variable force on said friction shoes which is a function of the closing velocity of said snubber, said hollow piston having a radially outwardly disposed head at an end adjacent said casing, said radially outwardly disposed head slidably sealing against said casing and said casing having a closed end forming a fluid receptacle with said second named tube and said hollow piston, a spring bearing against said flange on said first-named piston and said radially outwardly disposed head to exert restoring force on the snubber and said first-named tube having means resiliently sealing said hollow piston to provide a clean, lubricated sealing action therewith.

12. An hydraulic friction snubber comprising a casing, friction shoe means slidably engaging said casing, an elongated member slidably extending into said casing and bearing against one side of said friction shoe means, a piston bearing against the other side of said friction shoe means and hydraulic means effecting hydraulic force on said piston provided by the closing of said snubber and including piston means and a cylinder therefor together forming a receptacle and mutually reciprocable with closing and opening of the snubber, said cylinder defining axially spaced orifices successively closed by the piston means to control fluid pressure in the receptacle and means communicating the fluid pressure in the receptacle to the piston acting on the friction means, said orifices being increasingly closely arranged axially in the direction of the inward stroke of the piston means to permit full closing action of the snubber and calibrated pressure on the piston and friction shoe means.

13. An hydraulic friction snubber adapted to be connected between a pair of relatively movable members comprising a casing, a plurality of friction shoes in said casing in relatively movable, frictional engagement therewith, each of said shoes having a pair of convergingly inclined camming surfaces extending inwardly relative to said casing, an elongate member extending into said casing coaxially from one end of said casing and having a portion forming an inclined surface complementarily engaging one inclined surface on each of said friction shoes, a piston having an inclined camming surface complementarily engaging the other inclined camming surface on each of said friction shoes, said casing and said elongate member being relatively axially movable, hydraulic means urging said piston against said shoes with a force provided by the closing of said casing and said elongate member and spring means urging said casing and said elongate member axially away from one another.

14. A friction snubber adapted to be connected between a pair of relatively movable members comprising a casing, a plurality of friction shoes in said casing relatively movable in frictional engagement therewith, each of said shoes having a pair of convergingly inclined camming surfaces extending inwardly relative to said casing, an elongate member extending into said casing coaxially from one end of said casing and having a member forming an inclined surface complementarily engaging one inclined surface on each of said friction shoes, a piston having an inclined camming surface complementarily engaging the other inclined camming surface on each of said friction shoes, said casing and said elongate member being relatively axially movable and hydraulic means for urging said piston against said shoes and said shoes against said casing with a variable force produced by the closing of said casing and said elongate member including means forming a pressure chamber including means on said piston acted on by pressure in said pressure chamber and means transmitting pressurized fluid to said pressure chamber including means forming a plurality of axially spaced orifices and means successively closing said orifices by closing movement between said casing and said elongate member to control the pressure transmitted to said pressure chamber.

15. An hydraulic friction snubber comprising a casing closed at one end, a tube closed at one end and having the other end reciprocably received in the other end of said casing, friction shoes in said casing, wedge means on said tube cammingly engaging said friction shoes on one side thereof, a piston cammingly engaging said friction shoes on the other side thereof, metering means in said tube, a supply of fluid in said tube, an hydraulic piston actuated by the closed end of said casing and cooperating with said metering means to form a first pressure chamber, said hydraulic piston forcing fluid from said metering means upon closing of said snubber to control the closing velocity of said snubber, and means forming a second pressure chamber communicating with said first pressure chamber and exerting pressure on said piston cammingly engaging said friction shoes to urge said friction shoes against said casing with a force produced by the closing of said snubber.

References Cited in the file of this patent
UNITED STATES PATENTS

| | | |
|---|---|---|
| 2,084,320 | Coleman | June 22, 1937 |
| 2,869,685 | Funkhouser et al. | Jan. 20, 1959 |
| 2,928,507 | Thompson | Mar. 15, 1960 |